July 6, 1965

R. F. MORRISON, JR 3,193,828

AMPLITUDE MODULATING APPARATUS

Filed Sept. 11, 1961

INVENTOR.
ROBERT F. MORRISON, JR.

BY
Daniel D. Sharp

ATTORNEY

United States Patent Office 3,193,828
Patented July 6, 1965

3,193,828
AMPLITUDE MODULATING APPARATUS
Robert F. Morrison, Jr., Rochester, N.Y., assignor to General Dynamics Corporation, Rochester, N.Y., a corporation of Delaware
Filed Sept. 11, 1961, Ser. No. 137,177
12 Claims. (Cl. 343—100)

This invention relates to amplitude modulating apparatus and more particularly to a device for varying the amplitude of one or more radio frequency input signals applied to the input in accordance with the rotation of a portion of said device.

The device according to the invention may be used in an antenna simulator wherein the rotation of a rotary portion of the device causes a variation in amplitudes of an input signal applied to the device which substantially duplicates the result which would be obtained by rotating a directional receiving antenna relative to a target. By appropriate design, the device may be made to simulate one or more pairs of side lobes, in addition to the main lobe. The device may include more than one input coupling means, some or all of which can be adjusted over a considerable range of azimuth angle to simulate targets disposed at various azimuth angles.

The device includes a toroidal wave transmission path which may be an enclosure whose dimensions are such that it functions as a waveguide below cutoff; the attenuation characteristics, consequently, are substantially the same as those of a waveguide. An input transmission line protrudes into the waveguide enclosure and terminates in a plate which serves as one plate of a coupling capacitor. The other plate of the coupling capacitor is mounted on a rotating member to which an output transmission line is attached. The coupling between input and output lines is a function of the spacing between plates and the angle between the center lines of the plates. The angle through which the rotor is rotated before the amplitudes of the signal falls below one-half of its maximum amplitude is determined primarily by the angular width of the coupling plates. The rate at which the amplitude changes is determined by the dimensions of the enclosure within which the rotary plate moves and depends upon the attenuation characteristics of the waveguide. Additional plates may be added to the rotating member on either side of the aforementioned rotary plate to provide secondary maxima which simulate antenna side lobes. The relative amplitude of the lobe maxima are determined by the values of attenuating resistors inserted between the coupling plates and the output transmission means. The simulation of side lobes is enhanced by the use of a hybrid junction for combining the energy coupled by the various rotor plates in the proper manner. Antenna patterns normally have a marked null or minimum between the main lobe and the first side lobe. The hybrid junction permits energy from two adjacent plates to be combined with a phase difference of 180 degrees so that a marked decrease in amplitude results when the signals coupled to the hybrid junction from the adjacent plates are equal in amplitude. The device may be modified to simulate two signals at the same azimuth angle by two or more input coupling means coupled to opposite faces of the rotor coupling plate.

Other objects, features and advantages of this invention will become apparent from the description, taken in conjunction with the drawings wherein.

Figure 1:
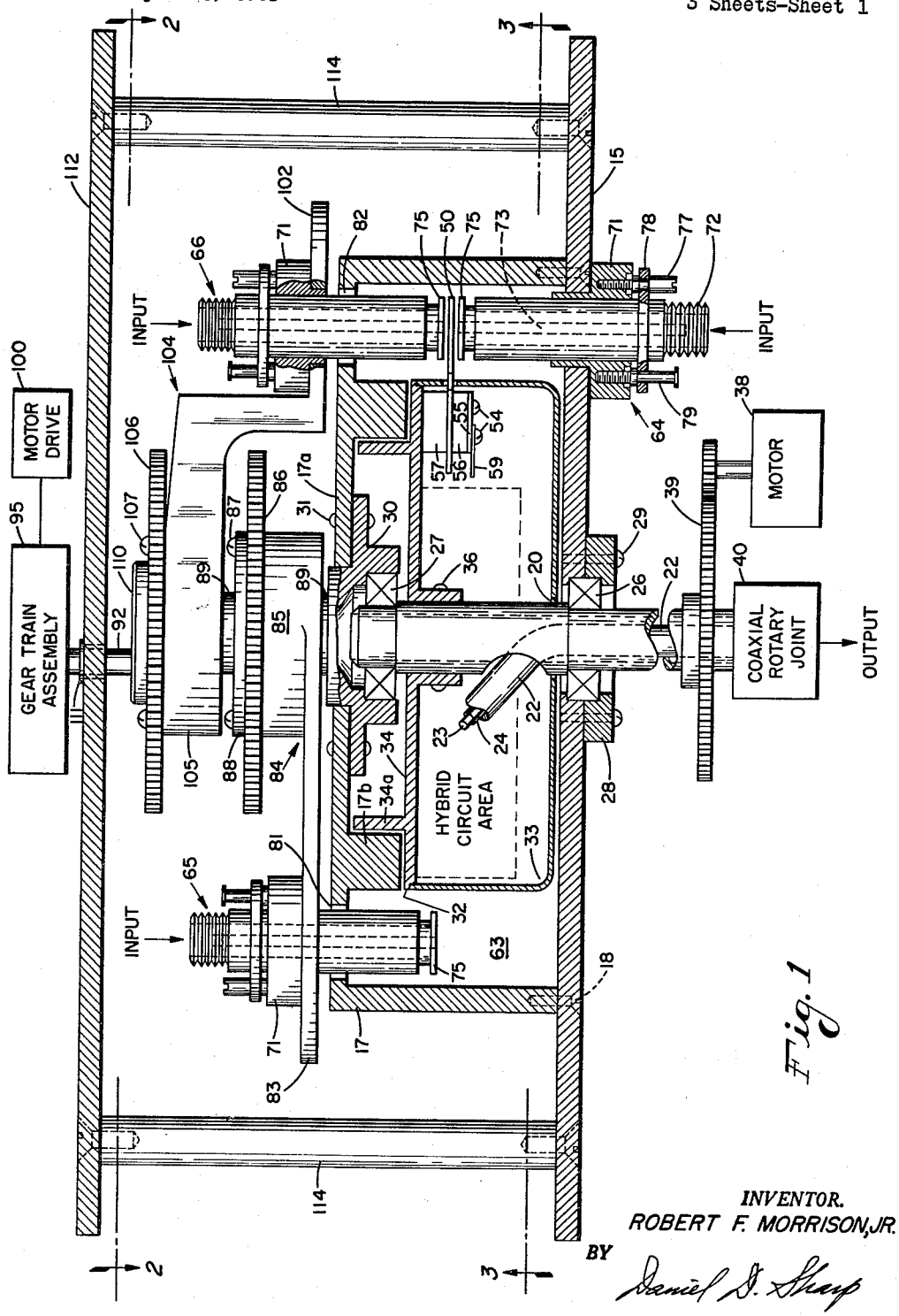
FIG. 1 is a section view, partly in elevation, of a device according to the invention.
Figure 2:
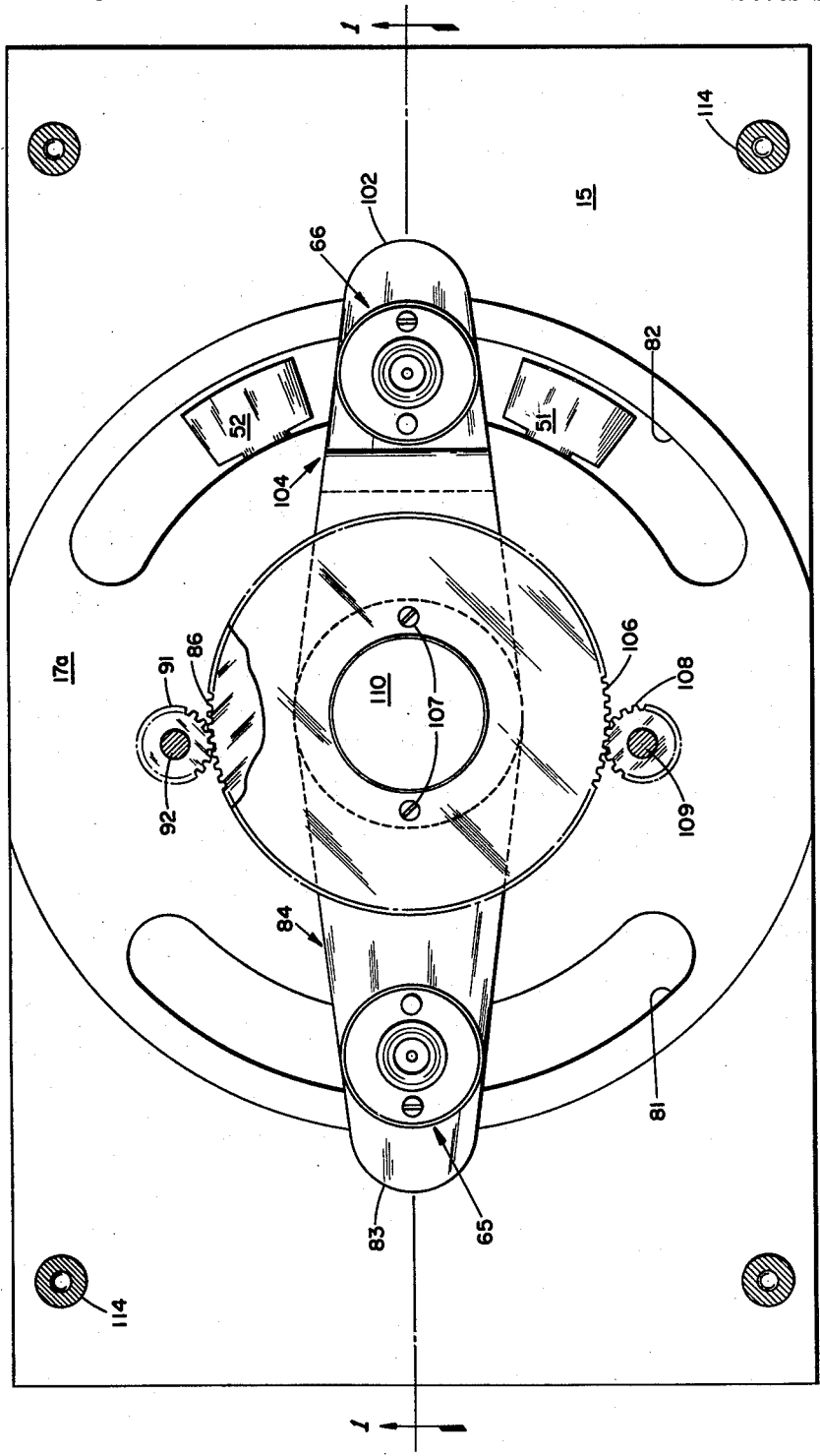
FIG. 2 is a plan view of the device of FIG. 1 taken along line 2—2.
Figure 3:
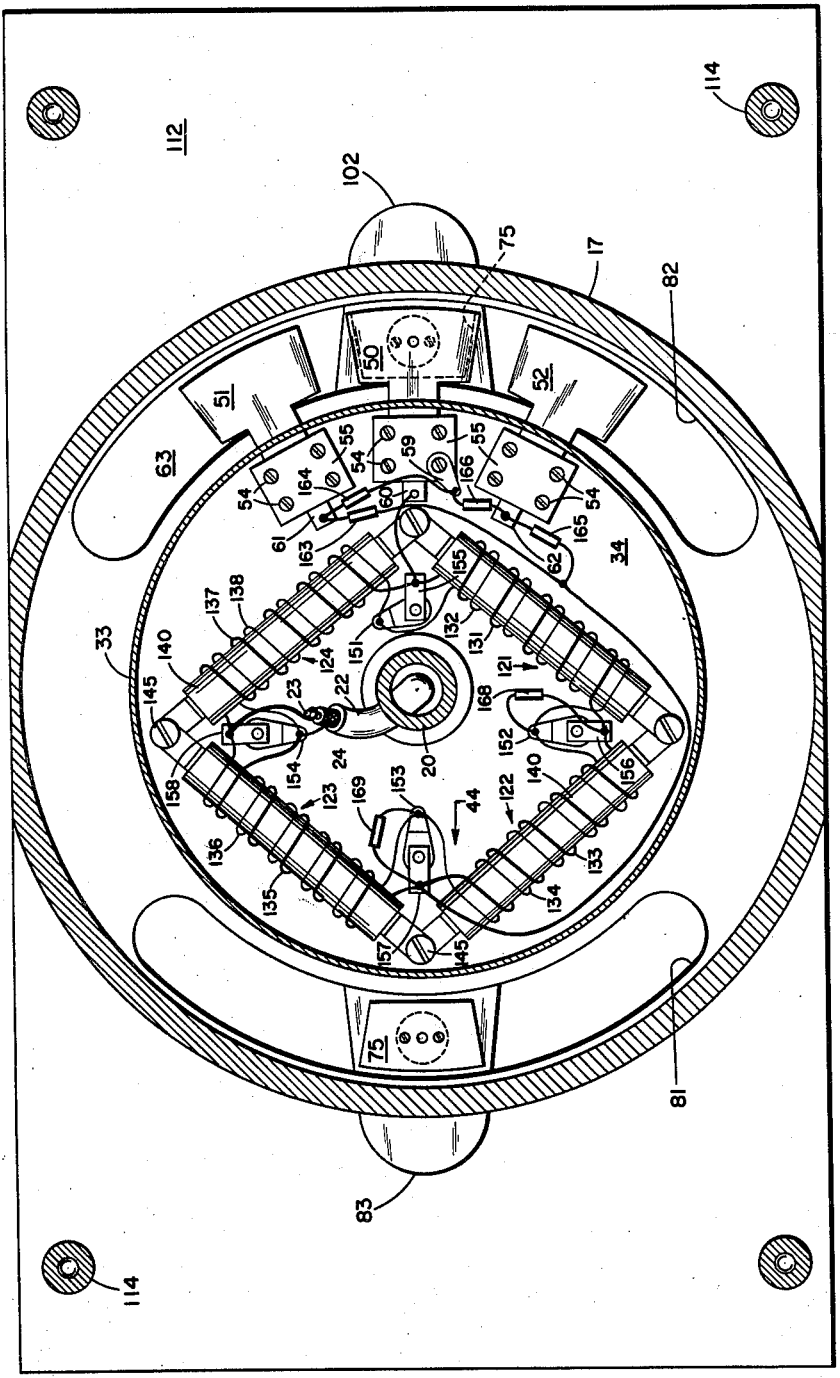
FIG. 3 is a plan view of the device of FIG. 1 taken along the section line 3—3.

Referring to FIGS. 1-3 of the drawings, the apparatus includes a base plate 15 to which a housing 17 is mounted, as by screws 18. An aperture in base plate 15 permits insertion of a sleeve 20 through which passes a flexible output coaxial transmission line 22 having an inner conductor 23 and an outer conductor 24. The sleeve 20 rotates on bearings 26 and 27. Bearing 26 is trapped between recesses in base plate 15 an bearing plate 28 and is fastened, as by screws 29, to the base plate. The bearing 27 is mounted within a hub 30 which is attached by screws 31 to the portion 17a of housing 17.

An enclosure 32, which may be fabricated of two members 33 and 34, is attached by fastening devices 36 to sleeve 20; the enclosure 32 is adapted to rotate with the sleeve 20 when driven through a gear train 39 by a controllable motor 38. The speed of motor 38 may be adjusted to correspond to the speed of antenna rotation which is to be simulated. A conventional coaxial-type rotary joint 40 serves as a transition between the rotating coaxial output line 22 and a fixed coaxial output terminal means, not shown. Mounted within the enclosure 32 and rotating therewith is a hybrid network 44, shown in detail in FIG. 3 but omitted in FIG. 1 for the sake of clarity. The region occupied by the hybrid circuit 44 is indicated in dotted lines in FIG. 1. Also contained within enclosure 32 and rotating therewith are one or more rotating coupling plates 50, 51 and 52; of these, only plate 50 is visible in FIG. 1. Each coupling plate is insulatedly mounted relative to the enclosure 32 by screws 54 which pass through metal plates 55 and electrically insulating blocks 56 and 57 disposed on either side of the corresponding coupling plate. The metal plates 55 may be at ground potential with a lug 59 attached to one of the plates 55 for connecting grounded portions of the hybrid circuit 44. The coupling plates 50, 51 and 52 may be provided with respective extensions 60, 61 and 62 of reduced size for connection to ungrounded terminations of the hybrid network 44. The housing 17 has a downwardly projecting angular portion 17b which is juxtaposed with an upwardly projecting portion 34a of enclosure 32 to increase the capacitance between the housing 17 and enclosure 32 to provide an adequate high frequency ground for the enclosure 32.

The toroidal region 63 bounded partially by the inner periphery of housing 17, the outer periphery of enclosure 32, portion 17b of housing 17, and the portions of the housing and base plate 15 lying between forms a toroidal waveguide whose transverse dimensions are small compared with the wavelength of the energy to be conveyed therethrough.

Three input coupling assemblies 64, 65 and 66 extend into waveguide 63 for coupling energy into the waveguide 63. These assemblies are shown in FIG. 1, by way of example, as being of the coaxial type. One of the input coupling assemblies, namely, input coupling assembly 64, is fixedly mounted and includes a bushing 71 secured to base plate 15. The coaxial assembly 64 further includes an outer conductor 72 threaded at one end to receive a coaxial fitting for an input coaxial cable and an inner conductor 73 which terminates in a coupling plate 75 electrically insulated from outer conductor 72. The coaxial line 72, 73 can be moved within bushing 71 so that the spacing of the coupling plate 75 relative to either of the coupling plates 50, 51 or 52 can be varied. Adjustment is effected by means of adjusting screws 77 which threadably engage bushing 71 after passing through a ring 78 brazed or otherwise attached to the outer periphery of outer conductor 72. Rotation of the coaxial line 72, 73 can be prevented by means of the alignment pin 79 which passes through an aperture in ring 78. By adjustment of screw 77, the degree of capacitive coupling of the input signal applied to the input coupling assembly 64 to the hybrid network 44 by way of coupling plate 75 and coupling plates 50–52 is adjustable. In addition to the fixed input coupling assembly 64, two movable input coupling assemblies 65 and 66 are provided, each of which may be rotated independently through a considerable angle by separate motor-gear drive. The movable input coupling assemblies 65 and 66 may be identical in construction with the fixed input coupling assembly 64 and like reference numerals will be used to identify corresponding parts thereof.

Input coupling assemblies 65 and 66 extend through respective arcuate slots 81 and 82 formed in housing 17; the configuration of these slots is clearly shown in FIGS. 2 and 3. Input coupling assembly 65 is mounted from the arm 83 of a rotary member 84 which terminates in a hub portion 85. A gear 86 is secured to the hub portion 85 by screws 87 which pass through an annular plate 88 and gear 86. The annular plate 88 also serves as a bearing clamp for retaining a ball bearing, not shown, which is positioned between the hub portion 85 of rotary member 84 and the longitudinal extension 89 of the hub 30 affixed to housing 17. A drive gear 91, shown only in FIG. 2, engages gear 86 and is keyed to shaft 92 which may be mechanically connected to a gear train assembly 95 driven by motor 100. This motor may be controllably energized to rotate member 84 so that the associated input coupling assembly 65 carried thereon is properly positioned along the slot 81 in housing 17. In this way, the position of the input coupling means 65 along waveguide 63 is adjusted to correspond to the azimuth angle of an incoming signal from a simulated target.

Similarly, the input coupling assembly 66 is mounted from the arm 102 of a rotary member 104 which includes a hub portion 105. An annular gear 106 is attached to hub portion 105 by screws 107 and engages a gear train assembly similar to gear train assembly 95 and actuated by a motor, not shown, but similar to motor 100. The gear train assembly may comprise, for example, a single drive gear 108 engaging annular gear 106 and keyed to shaft 109; the shaft, in turn, is mechanically coupled to the last-mentioned drive motor. A cap 110 is provided to cover an exposed rotary bearing which is located between the hub portion 105 of rotary member 104 and the longitudinal extension 89 of the hub 30 that is affixed to housing 17.

Support for the shafts 92 and 109 may each be provided by bearing 111 which, in turn, is supported within a mounting panel 112 spaced from the base plate 15 by tubular posts 114. Controlled rotation of the drive motor associated with gears 106 and 108 will adjustably position the input coupling probe 66 to a desired location along the coupling slot 82 in housing 17. It should be noted that the input coupling assembly 66 can be adjusted to be in alignment with the fixed input coupling assembly 64 in order to simulate two targets disposed along the same line. In this case, the coupling plates 75 of the input coupling assemblies 64 and 66 will be in line and capacitively coupled to opposite faces of the coupling plates 50–52. The size of the coupling plate 75 preferably should be of the same separate area and dimensions as coupling plates 50–52. If the coupling plates are too small, the output from the device will be unduly limited; on the other hand, if the coupling plates are too large, the desired output-azimuth pattern will be distorted because of the wide azimuth range over which coupling can be obtained.

The position of the movable input probes 65 to 66 will correspond to the azimuth of the targets to be simulated. With three input coupling probes being energized, three targets may be simulated; any combination of input coupling probes may, of course, be energized by input energy.

The hybrid network 44, shown in detail in FIG. 3, consists of a continuous loop of two-conductor transmission line made up of four interconnected branch lines 121, 122, 123 and 124. Branch line 121 includes two parallel conductors 131 and 132, while branch line 122 includes spaced conductors 133 and 134; similarly, branch line 123 includes conductors 135 and 136, and branch line 124 comprises the conductor pair 137, 138. The conductors of a given line are wound upon coil forms 140 made of a dielectric material. The coil forms 140 are connected together, and are mounted to the enclosure 33, by mounting screws 145. One termination of each of the conductors of a given branch line is connected to ground or to some other reference potential, while the other termination is at some potential relative to ground. Lugs 151, 152, 153 and 154 serve as ground terminals, while the terminals 155, 156, 157 and 158, which are electrically insulated from the corresponding lugs, provide means for attaching the ungrounded terminations of the various conductors 131–138 of the hybrid network.

The main lobe coupling plate 50 is connected to terminal 155 which is common to branch lines 121 and 124. The side lobe coupling plates 51 and 52 are connected by way of individual attenuating networks to terminal 157 which is common to branch lines 122 and 123. The attenuating network for coupling plate 51 includes a resistor 163, shunted by a resistor 164, one end of which may be connected to ground lug 59. The attenuating network associated with coupling plate 52 consists of a resistor 165, shunted by a resistor 166, one end of which is attached to ground lug 59. The attenuating networks permit the relative amplitude of the signals fed through the respective side lobe coupling plates 51 and 52 to be adjusted; consequently, the relative amplitude of the side lobes, as well as the amplitude of the side lobes relative to the main lobe, may be adjusted to any desired value. The inner and outer conductors 23 and 24 of the input coaxial line 22 are connected, respectively, to terminal 158 and ground lug 154, that is, to the junction of branch lines 123 and 124. The conductors of each branch line are a quarter-wavelength long at the main operating frequency. A 90 degree phase shift thereby is produced in branch lines 121, 122 and 124. The conductors 135 and 136 of branch line 123, however, are transposed, whereby an additional 180 degrees phase shift is introduced into the branch line 123.

Input energy from the given input coupling assembly, when coupled to the hybrid network 44 by way of the main lobe coupling plate 50, undergoes a phase shift of 90 degrees in each of branches 121 and 122 and 270 degrees phase shift in branch 123, for a total phase shift of 450 degrees; the same energy traveling by way of branch line 124 undergoes a phase shift of 90 degrees. Consequently, such energy traversing either of the two available paths to output line 22 emerges in phase. Energy coupled to the hybrid network 44 by way of the side lobe coupling plates 51 and 52 reaches the output line 22 by either of two paths. The path through branch lines 121, 122 and 124 introduces a phase shift of 270 degrees, while the phase shift encountered through the other path through branch line 123 is also 270 degrees. The energy reaching the output line 22 from the main lobe coupling plate 50 consequently is in phase opposition with energy reaching the output line from the two side lobe coupling plates 51 and 52. Antenna patterns normally have a marked minimum between the main lobe and the first side lobes. The use of the hybrid junction 44, by allowing energy from the two adjacent coupling plates, that is, between plates 50 and 51 and between plates 50 and 52, to be combined in phase opposition, causes a marked decrease in amplitude when the signals are equal in amplitude. The hybrid junction 44 thereby enhances simulation of antenna side lobes. Although two coupling plates 51 and 52 are shown in FIG. 2, in addition to the main coupling plate 50, it should be understood that additional coupling plates may be mounted to the rotating enclosure 32 if further secondary maxima are desired. Usually, however, the first side lobes are the only ones of considerable importance. If more than one pair of secondary maxima is required, it would be necessary to alter the connections to the hybrid network 44.

The coupling between any given incoming transmission line and the output line 22 is a function not only of spacing between the coupling plate 75 of the corresponding input coupling assembly and the coupling plates 50–52, but also is a function of the angle between the center lines of the coupling plate and the particular coupling plate under consideration. The angle through which the rotating assembly rotates before the amplitude of the output signal falls to a given percentage of the maximum amplitude is determined primarily by the annular width of the coupling plates.

The rate of decrease in output signal amplitude increases rapidly as the angle of rotation is increased so that the coupling plates no longer overlap. The rate at which the amplitude falls is determined by the dimensions of the wave transmission path 63 within which the coupling plates move. The dimensions of the waveguiding enclosure 63 must be such that it functions as a waveguide below cutoff. The enclosure dimensions are chosen to provide an attenuation rate in decibels per degree which approximates that of the antenna to be simulated. The rate of attenuation is inversely proportional to the size of the waveguide. For example, for a circular waveguide the attenuation $\alpha$ in decibels per inch of travel is given by $$\alpha = \frac{32}{d}\sqrt{1-\left(\frac{2d}{\lambda}\right)^2}$$

where $d$ is the diameter of the waveguide in inches and $\lambda$ is the wavelength in inches.

When the dimension $d$ is small compared with $\lambda$, the attenuation rate is approximately equal to $32/d$ decibels per inch.

Although only one set of rotating coupling plates is provided in the device illustrated, more than one set may be provided if operation over two or more widely spaced frequency bands is desired. In this event, each set of rotating coupling plates would be of different dimensions and would be connected selectively to its own hybrid network through a coaxial switch having a common contact connected to output line 22.

What is claimed is:

1. An antenna simulating device having a rotary portion and providing an output signal wherein the manner of variation of magnitude of said signal with angular position of said rotary portion approximates the radiation pattern of said antenna comprising a toroidal wave guide dimensioned to operate below cutoff for the operating frequency range of input energy involved, at least one input coupling means for introducing energy into said wave guide means representative of energy received by said antenna, at least one rotating pick-off means mounted to rotate along said transmission means at a velocity equal to the angular velocity of rotation of the antenna being simulated past said input coupling means in energy coupling relationship with said input coupling means, and output coupling means coupled to said pick-off means for deriving an output dependent on the relative angular positions of said pick-off means and said input coupling means.

2. An antenna simulating device comprising an annular wave guide, at least one input coupling means for introducing energy into said wave guide, and at least one rotating pick-off means mounted to rotate within said wave guide past said input coupling means and in energy coupling relationship with said input coupling means, said wave guide being dimensioned to operate below cutoff for the operating frequency range of input energy involved.

3. In a combination, a toroidal wave guide transmission means, at least one input coupling means for introducing energy into said wave guide transmission means dimensioned to operate below cutoff for the operating frequency range of input energy involved, a cylindrical rotating enclosure whose outer periphery forms a portion of the boundary of said wave guide transmission means, a rotating pick-off assembly mounted to rotate with said rotating enclosure within said transmission means past said input coupling means and in energy coupling relationship therewith, pick-off assembly including a plurality of individual segments which pick up energy sequentially from said input coupling means, and network means coupled in individual fashion to each of said separate segments for combining energy from alternate ones of said segments in phase opposition.

4. In an antenna simulating device for simulating an antenna radiation pattern having a plurality of lobes, an annular wave guide transmission means, at least one input coupling means for introducing energy into said wave guide transmission means, at least one rotating pick-off means mounted to rotate within said wave guide transmission means past said input coupling means and in energy coupling relationship with said input coupling means, said pick-off means including separate elements for each of said side lobes coupled to said pick-off means, and means for combining the energy received by said elements of said pick-off means in controllable phase relationship.

5. In combination, a housing, a cylindrical rotating enclosure mounted to rotate relative to said housing, the outer periphery of said enclosure and a portion of said housing forming a portion of the boundary of a toroidal wave transmission means, a plurality of input coupling means for introducing energy into said wave transmission means, motive means for individually rotating said input coupling means along said transmission means, a rotating pick-off assembly rotatable with said enclosure independently of said motive means, along said transmission means past said input coupling means in energy coupling relationship therewith, and output coupling means coupled to said pick-off assembly.

6. In combination, an annular wave transmission means, a plurality of input coupling means for introducing energy into said wave transmission means, at least one of said input coupling means being fixedly adjustable along a sector of said wave transmission means, at least one of said input coupling means being stationarily disposed within said sector, at least one rotating pick-off assembly mounted to rotate along said transmission means past said input coupling means, said rotating pick-off assembly including a plurality of separate pick-off segments sequentially coupled to a corresponding one of said input coupling means once during each revolution, and output coupling means coupled to said pick-off segments by means of a hybrid phase shifting network.

7. In a device for simulating an antenna radiation pattern having a main lobe and a plurality of side lobes comprising an annular wave guide transmission means having dimensions below cutoff for the operating frequency involved, at least one input coupling means for introducing energy into said wave guide transmission means, at least one rotating pick-off assembly mounted to rotate along said transmission means past said input coupling means in energy coupling relationship therewith, said pick-off assembly including discrete portions for each of said lobes, output coupling means coupled to said pick-off assembly, attenuating means connected between said output coupling means and said portions of said pick-off assembly, and phase reversing means connected between said output coupling means and alternate portions of said pick-off assembly.

8. In combination, an annular wave guide transmission means, at least one input coupling means for introducing energy into said wave guide transmission means guide, at least one rotating pick-off assembly mounted to rotate past said input coupling means in energy coupling relationship therewith, said pick-off assembly including a main pick-off element and at least one pair of auxiliary pick-off elements flanking said main pick-off device, a hybrid network including attenuating means in circuit with each of said auxiliary pick-off elements and phase reversing means connected in circuit with alternate ones of said pick-off elements, and output coupling means coupled to said pick-off elements by way of said hybrid network.

9. A simulating device for a directional rotary antenna with a response pattern having a main lobe and at least one pair of side lobes whereby a time varying output is provided which varies with rotation of a rotary portion of said device in a manner similar to that obtained by rotating said simulated antenna relative to a simulated target comprising an annular wave transmission means, at least one input coupling means for introducing energy into said wave transmission, means for controllably moving said input coupling means along said wave transmission means to an angular position corresponding to the bearing of said simulated target, a pick-off assembly including a main pick-off element for said main lobe and at least one pair of auxiliary pick-off elements for each pair of side lobes flanking said main pick-off element, means for rotating said pick-off assembly along said transmission means past said input coupling means during each revolution at an angular velocity equal to that of the rotation of the antenna being simulated, output coupling means, and network means for coupling energy picked up by said pick-off elements to said output coupling means, said network means including phase reversing means connected in circuit with alternate ones of said pick-off elements.

10. An antenna simulating device as set forth in claim 9 wherein said wave transmission means comprises a wave guide operating below cutoff for the operating frequency involved and having an attenuation substantially inversely proportional to the dimension of said wave guide transverse to the direction of propagation of energy therealong.

11. A simulating device for a directional rotary antenna with a response pattern having a main lobe and at least one pair of side lobes whereby a time varying output is provided which varies with rotation of a rotary portion of said device in a manner similar to that obtained by rotating said simulated antenna relative to simulated targets comprising an annular wave guide operating below cutoff for the frequency range of input energy involved, a plurality of input coupling means for introducing energy into said wave guide, at least one of said input coupling means being fixed, means for controllably moving other of said input coupling means along said wave guide independently to angular positions corresponding to the bearing of respective simulated targets, a pick-off assembly including a main pick-off element for said main lobe and at least one pair of auxiliary pick-off elements for each pair of side lobes, means for rotating said pick-off assembly past each of said input coupling means during each revolution at an angular velocity equal to that of the rotation of the antenna being simulated, output coupling means, and network means connected in circuit with said pick-off elements and in circuit with said output coupling means for providing a phase reversal of the input energy coupled by way of alternate ones of said pick-off elements to said output coupling means.

12. A simulating device set forth in claim 11 wherein said network means includes a hybrid for transferring energy picked up by said auxiliary pick-off elements over a first pair of paths and for transferring energy picked up by said main pick-off element over a second pair of paths, said first pair of paths introducing a phase shift differing from that produced by said second pair of paths by an odd multiple of 180°.

References Cited by the Examiner
UNITED STATES PATENTS

| | | | |
|---|---|---|---|
| 2,477,635 | 8/49 | Marchand | 333—7 |
| 2,749,524 | 6/56 | De Rosa et al. | 333—7 |
| 2,997,669 | 8/61 | Charles | 333—7 |
| 3,018,566 | 1/62 | Krueger | 35—10.4 |

CHESTER L. JUSTUS, *Primary Examiner.*

HERMAN K. SAALBACH, *Examiner.*